US005401584A

United States Patent [19]

Minasy et al.

[11] Patent Number: 5,401,584

[45] Date of Patent: Mar. 28, 1995

[54] SURVEILLANCE MARKER AND METHOD OF MAKING SAME

[75] Inventors: Arthur J. Minasy, Woodbury; Peter Y. Zhou, Smithtown; Thomas P. Solaski, Huntington; Edward J. Callaghan, Oyster Bay, all of N.Y.

[73] Assignee: Knogo Corporation, Hauppauge, N.Y.

[21] Appl. No.: 118,723

[22] Filed: Sep. 10, 1993

[51] Int. Cl.[6] .................................................. B32B 9/00

[52] U.S. Cl. .................................... 428/611; 428/615; 340/551; 340/572

[58] Field of Search ................ 340/551, 572; 428/611, 428/615

[56] References Cited

U.S. PATENT DOCUMENTS

| | | | |
|---|---|---|---|
| 3,747,086 | 7/1973 | Peterson | 349/280 |
| 3,820,104 | 6/1974 | Fearon | 340/280 |
| 4,158,434 | 6/1979 | Peterson | 235/382 |
| 4,260,881 | 4/1981 | Peterson | 235/493 |
| 4,539,558 | 9/1985 | Fearon | 340/572 |
| 4,686,154 | 8/1987 | Mejia | 428/611 |
| 4,743,890 | 5/1988 | Hilzinger et al. | 340/551 |
| 5,130,698 | 7/1992 | Rauscher | 340/551 |
| 5,146,204 | 9/1992 | Zhou et al. | 340/551 |
| 5,181,021 | 1/1993 | Lee et al. | 340/572 |
| 5,225,807 | 7/1993 | Zhou et al. | 340/551 |

*Primary Examiner*—Patrick J. Ryan
*Assistant Examiner*—Kam F. Lee
*Attorney, Agent, or Firm*—Fitzpatrick, Cella, Harper & Scinto

[57] ABSTRACT

A deactivatable electronic theft detection marker is made from a strip or ribbon of high magnetic permeability strip or ribbon and then high magnetic coercivity material is deposited on the strip or ribbon by electroplating.

7 Claims, 6 Drawing Sheets

SURVEILLANCE MARKER AND METHOD OF MAKING SAME

BACKGROUND OF THE INVENTION

1. Field of the Invention

This invention relates to electronic article surveillance systems and more particularly it concerns novel deactivatable and reactivatable markers for use in such systems as well as novel methods of making such markers.

2. Description of the Related Art

It is known to electronically monitor the passage of goods from a protected area by setting up an interrogation zone at an exit from the protected area, attaching special targets or markers to the goods and detecting the presence of the targets or markers when the goods are carried through the interrogation zone. In magnetic type electronic article surveillance systems, a continuous alternating magnetic interrogation field is generated in the interrogation zone; and when a marker is subjected to this field it becomes driven alternately into and out of magnetic saturation and thereby produces characteristic detectable disturbances of the interrogation field. When such a disturbance is detected, the system produces an alarm.

The markers in magnetic type electronic article surveillance systems are usually provided with deactivation elements which comprise magnetizable material of a substantially higher magnetic coercivity than that of the markers. When the deactivation elements are magnetized, they produce magnetic fields which bias the markers into magnetic saturation to such a degree that the magnetic interrogation fields can no longer drive the markers into and out of saturation. Thus the markers are rendered incapable of producing detectable disturbances of the interrogating fields; and the articles to which they are attached may pass through the interrogation zone without activating an alarm. These markers may thereafter be reactivated by demagnetizing their respective deactivation elements. U.S. Pat. Nos. 5,146,204, 5,225,807 and U.S. Pat. No. 4,623,877 describe such markers and electronic article surveillance systems in which such markers are used.

There are two basic types of deactivatable markers which can be used in magnetic electronic article surveillance systems. The first type makes use of a plurality of high coercivity magnetizable elements which are spaced apart and distributed along the length of the marker. These markers can be activated and deactivated by remotely generated magnetic fields, provided that the markers are substantially aligned with these fields the second type of deactivatable marker makes use of a single elongated strip of high coercivity material which extends along the length of the marker. When magnetic elements capable of generating a series of spaced apart magnetic fields are brought into contact with the high coercivity material, they cause a pattern of magnetization to be imposed along the material so that it appears as a series of spaced apart magnetic elements.

In the past, both types of deactivatable marker have been expensive to produce, both from the standpoint of the materials required and from the standpoint of the number of separate manufacturing steps involved in producing the marker. In most cases, the marker and its deactivation element or elements, because of their very different magnetic and mechanical characteristics, had to be separately produced and then assembled. In some instances, for example, as described in U.S. Pat. Nos. 4,950,550 and 5,130,698, it has been proposed that the marker and the deactivation element be formed together and subjected to common drawing and heat treating operations. This however, results in less than optimum processing for the marker or the deactivation element or both. Moreover such process cannot be used for markers which have a series of deactivation elements and therefore they can not be remotely activated and deactivated. Also, as described in U.S. Pat. No. 5,181,021, it has been proposed to form high coercivity deactivation elements by painting onto a marker a coating which comprises high coercivity magnetic powder such as ferric oxide dispersed in a polymer binder. However, the thickness required for such deactivation elements is prohibitively large when such elements are used with markers of thickness greater than 0.001 inch (0.004 mm). U.S. Pat. No. 4,536,229 proposes to separately produce deactivation elements which are cold rolled.

U.S. Pat. No. 4,956,636 proposes a process for manufacturing a deactivatable marker by electroplating a nickel ferrite layer onto a flexible polyester substrate that has been treated by first depositing thereon thin films of chromium and copper to form a "strike layer". Thereafter a hard magnetic layer is made by cutting out strips of magnetic tapes and arranging them on the nickel ferrite layer. This however does not solve the problem of separate manufacture of the hard magnetic layer or of attaching the layer to the marker.

SUMMARY OF THE INVENTION

The present invention provides a novel deactivatable type marker for electronic article surveillance systems which is thin and compact and therefore suited for "source tagging", that is, insertion into articles to be protected at their source of manufacture. This type of tagging can be automated; and it relieves the merchant of the need for applying markers to individual articles of merchandise. Source tagging is also desirable because markers can be hidden in the merchandise and are not susceptible to tampering. The present invention also provides a novel method of manufacturing deactivatable type markers which eliminates most of the manufacturing steps of prior methods and which also eliminates much of the extra material that was required in prior manufacturing processes.

According to one aspect of the present invention there is provided a deactivatable electronic article surveillance system marker which comprises an element of easily magnetizable material having high magnetic permeability and low magnetic coercivity such that, when subjected to continuous alternating magnetic interrogation fields, the element will produce characteristic detectable disturbances of those fields; and another magnetizable material which has a higher magnetic coercivity than the material of the element. The other magnetizable material is deposited on the element on an atom by atom basis, that is, by electrodeposition, vacuum deposition or sputtering.

According to another aspect of the invention there is provided a novel method of manufacturing a deactivatable electronic article surveillance system marker. This method comprises the steps of providing an element of easily magnetizable material having high magnetic permeability and low magnetic coercivity such that, when subjected to continuous alternating magnetic interrogation fields, will produce characteristic detectable disturbances of those fields. Then, another magnetizable material which has a higher magnetic coercivity than the material of the element, is deposited onto the surface of the element, on an atom by atom basis, that is by electroplating, vacuum deposition or by sputtering.

DETAILED DESCRIPTION OF THE PREFERRED EMBODIMENTS

Figure 1:
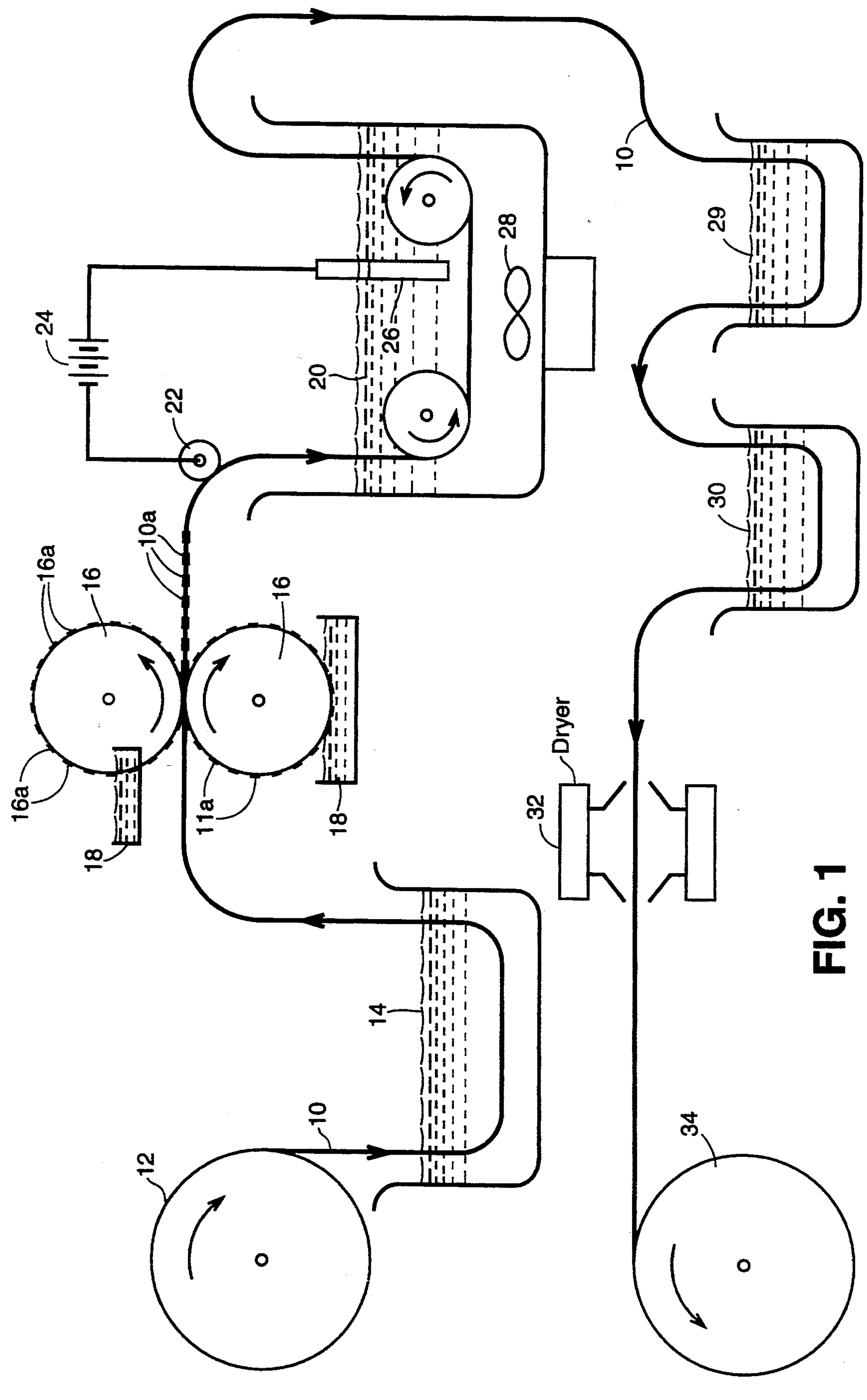
FIG. 1 is a schematic representation of a first portion of a process for producing deactivatable markers according to a first embodiment of the invention.

As shown in FIG. 1 a continuous thin ribbon or strip 10 of soft magnetic material such as Permalloy or amorphous metal such as Metglas®, is wound off a supply spool 12. The strip 10 first passes through a degreasing bath 14 which removes impurities from the surfaces of the strip. The degreasing bath solution may comprise any conventional commercial cleaner/degreaser such as methyl alcohol ($CH_3OH$).

The strip 10 then passes between a pair of masking rollers 16 which have spaced apart mask forming elements 16*a* distributed along their surface. These mask forming elements pass through a hot wax bath 18 as the masking rollers turn and in doing so they acquire a coating of hot wax. As the strip 10 passes between the rollers 16 it encounters the spaced apart mask forming elements 16*a* which deposit spaced apart wax coatings which form masks 10*a* on the surfaces of the strip 10.

After receiving the masks 10*a*, the strip 10 passes through an electrolytic plating bath 20. Electroplating baths suitable for this purpose are described in U.S. Pat. Nos. 2,834,725 and 2,619,454; and they may comprise a mixture of cobaltus chloride $CoCl_2 6H_2O$) nickel chloride ($NiCl_2 6H_2O$), boric acid and potassium thiocyanate. Upon entering the bath 20, the film contacts an electrode wheel 22 which is connected to the negative side of a voltage source 24. The positive side of the voltage source 24 is connected to an anode 26, which may be a block or bar of cobalt, nickel, cobalt-nickel alloy or an insoluble, conductive material such as graphite or platinum immersed in the plating bath 20. A stirrer 28 within the bath 20 keeps it in constant motion. During its passage through the bath, the strip 10 has deposited thereon, in the non-masked regions, spaced apart regions of the high magnetic coercivity magnetic material, which in this case is a nickel-cobalt alloy.

After exiting the bath 20, the strip 10, with the electroplated layer thereon, is passed through a dewaxing solution 29, which dissolves and removes the wax masking on the strip. The strip is then directed into a rinsing solution 30, which may be water, to rinse off any excess masking material as well as any excess electroplating solution. The strip then passes through a dryer 32 which blows hot air on the strip to dry it. The strip is then wound up on a take up spool 34.

Figure 2:
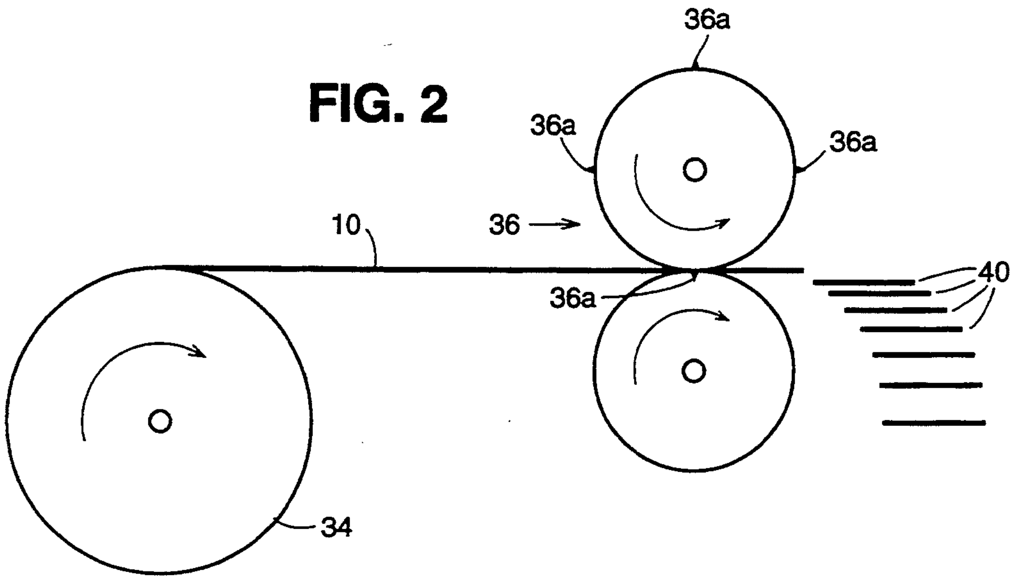
FIG. 2 is a schematic representation of a second portion of the process according to the first embodiment.

The spool 34 with the electroplated strip 10 wound thereon is then transferred to a cutting station as illustrated in FIG. 2. Here the strip 10 is unwound from the spool 34 and is passed through a pair of cutting rolls 36 having cutting elements 36*a* which cut the strip into individual markers 40. These markers, which have no covering or other material associated with them, may then be inserted into articles to be protected or to packaging for those articles during their manufacture. This eliminates the need for attaching the markers to the articles or to their packaging at the point of retail sale, which is usually a time consuming and costly operation.

The above described process produces what are known as remotely deactivatable markers. That is, the plated regions of the markers 40 can be magnetized to desensitize the markers by application of magnetic fields from sources which do not touch the marker, so long as those fields are oriented along the length of the marker. The invention can also be used to produce what are known as colineal markers. In this case, the step of masking selected portions of the marker prior to the electroplating step would be eliminated; and the plating would extend along the entire length of the marker without interruption.

Two specific examples of the electroplating process described in general above, will now be described.

EXAMPLE NO. 1

A plating bath as described in U.S. Pat. No. 2,834,725 was used to produce plated film on the strip 10 which was made of known marker material, namely a ribbon of either Permalloy or an amorphous material known as Metglas®. Other plating baths may be used, for example that disclosed in U.S. Pat. No. 2,619,454. Operating parameters in this embodiment were as follows:

Temperature (of the bath): 40°–80° Centigrade;

Current Density: 100 amp/ft$^2$ DC and 200 amp/ft$^2$ AC (60 Hz);

(A current density of 200 Amps per foot squared AC 60 Hertz superimposed on 100 Amps per foot squared DC achieves desired semi-hard magnetic properties.)

pH of the bath: 2.0–3.0;

Time in bath: 2.5 to 10 minutes;

Anode material: Co, Co-Ni, Ni or an insoluble electrically conductive material such as graphite or platinum.

Films of 0.0005–0.001 inch (0.0127–0.0254 mm) were plated within 5–10 minutes. The films so deposited were smooth, bright and adhered to the substrate very well. Properties of such as-plated films are given below. For comparison, the properties of a ribbon of Arnokrome® (a material normally used as a desensitizing element) are also included.

Sample No. 1—2.5"×0.0625"×0.0010" (6.35 cm×0.0159 mm×0.025 mm)

Sample No. 2—2.5"×0.0590"×0.006" (6.35 cm×0.0006 mm×0.015 mm)

Sample No. 3—2.5"×0.0260"×0.0010" (6.35 cm×0.0006 mm×0.0025 mm)

Arnokrome—2.5"×0.0625"×0.0020" (6.35 cm×0.0159 mm×0.050 mm)

TABLE I

| Sample | Coercivity ($H_c$) | Saturation Induction ($B_s$) | Residual Induction ($B_r$) |
|---|---|---|---|
| No. 1 | 101 | 311 | 288 |
| No. 2 | 84 | 174 | 158 |
| No. 3 | 91 | 100 | 94 |
| Arnochrome | 92 | 328 | 300 |

Note: The values given for saturation induction and residual induction are given in arbitrary units and are for comparison only. The coercivity is measured in oersteds.

EXAMPLE NO. 2

Markers, i.e. targets, were prepared as described in EXAMPLE NO. 1, except that the substrate or strip 10 was selectively masked in order to place segments of the plated material on the strip. Masking was accomplished by placing acid resistant tape onto the substrate at locations that were to be kept from being plated. Also, if desired, similar patterns could be obtained by masking with waxes described in connection with FIG. 1 or by coating the strip 10 with wax and then removing the wax from those areas that are to be plated. Alternatively a non-conductive paint or lacquer can be sprayed onto the strip at locations that are not to be plated. Photomasking techniques may also be used.

Figure 3:
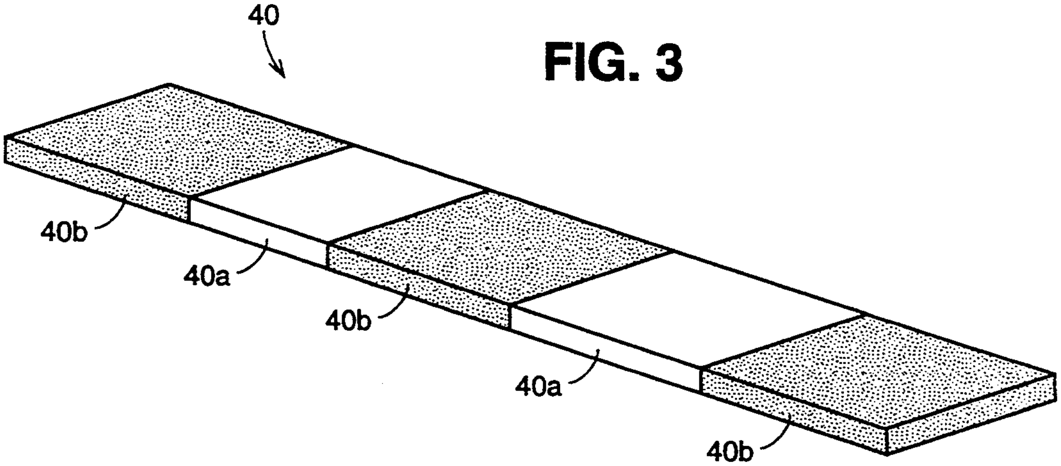
FIG. 3 is an enlarged perspective view of a deactivatable marker produced according to the process of FIGS. 1 and 2.

FIG. 3 shows, in enlarged perspective view, a marker 40 produced according to the present invention. As can be seen, the marker 40 comprises a continuous base 40*a*, which is the same as the original strip 10, with regions 40*b* of high coercivity material which has been plated onto the base 40*a*. The high coercivity material has been applied to the base in an atom by atom deposition process. As a result, an intimate contact is achieved between the base and the high coercivity material; and no adhesive or other intervening material exists between the base and the high coercivity material. Consequently, the high coercivity material is effective even in a very thin layer, to bias the base material into magnetic saturation. It will also be appreciated that only the precise amount of material found on the finished target or marker is used in its manufacture and the cost of producing the marker is minimized. Further, this process avoids the need to separately form high magnetic coercivity elements and then to physically apply them to the base material. Because of this, the number of manufacturing steps needed to make the marker is reduced.

Figure 4:
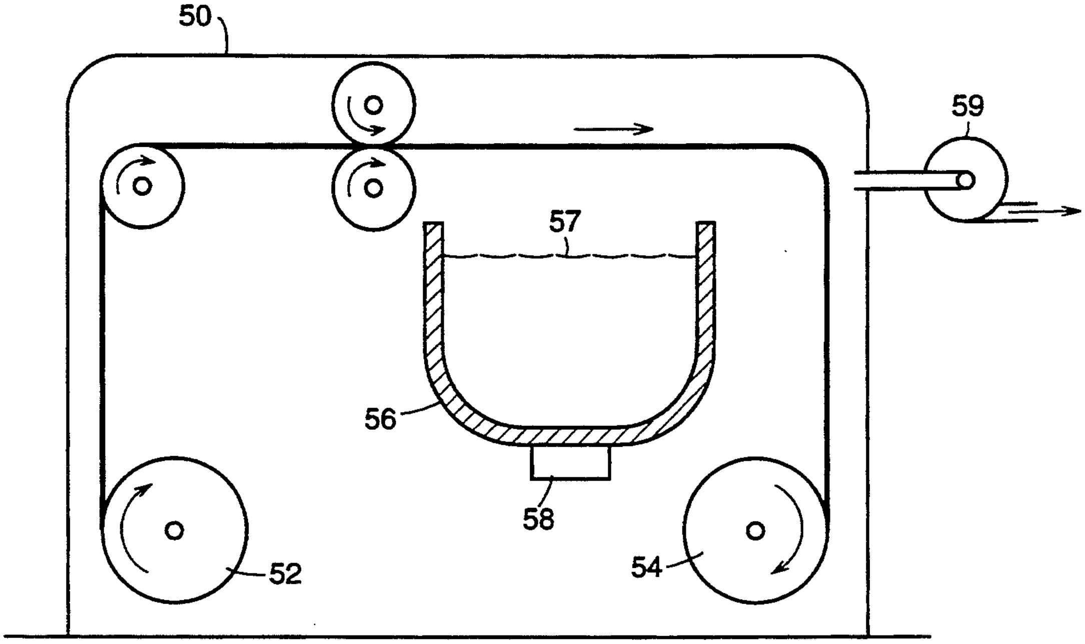
FIG. 4 is a schematic representation of a first alternative embodiment according to the present invention.

In the embodiment of FIG. 4, the strip 10 is not electroplated but instead the higher coercivity magnetic material is deposited onto the strip by vacuum deposition.

In FIG. 4 there is provided a vacuum chamber 50 in which the strip 10 is unwound from a supply spool 52 and is wound back onto a receiving spool 54 within the chamber 50. Also provided in the chamber 50 is a crucible 56 which contains a molten alloy 57 of the material to be deposited, in this case a cobalt/nickel alloy, preferably about 80% cobalt and 20% nickel. The crucible 56 is provided with a heater 58 to keep the alloy in a molten state. An evacuation pump 59 on the chamber 50 operates to maintain a pressure inside the chamber approximately at $10^{-3}$ Torr. (One Torr equals one millimeter of mercury, or 1/760 atmospheres). The crucible 56 is maintained at a temperature of about 1200° C. in order to maintain the alloy in the crucible in a molten state. The strip 10 is directed to pass directly over the open top of the crucible 56 as it moves from the supply spool 52 to the receiving spool 54. The speed of strip movement is preferably maintained at about 10 cm/min. A faster speed will result in a thinner deposition and a slower speed will result in a thicker deposition. It will be appreciated that the strip 10 may be masked in the manner described above by means of masking rolls 16 or in any other well known way to restrict the deposition to non-masked regions of the strip.

Figure 5:
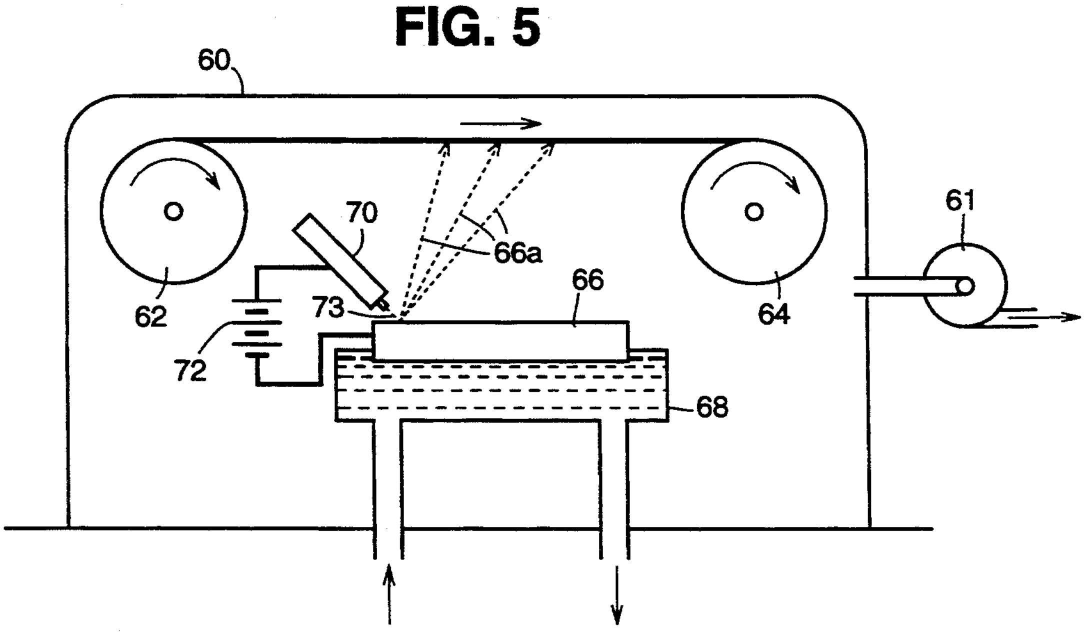
FIG. 5 is a schematic representation of a second alternative embodiment according to the present invention.

FIG. 5 shows a still further embodiment of the invention wherein the higher magnetic coercivity material is deposited on the strip 10 by a sputtering process. In FIG. 5 there is provided a vacuum chamber 60 in which an Argon atmosphere is maintained by means of a vacuum pump 61 at a pressure of about 1 Torr. The strip 10 is unwound from a supply spool 62 and is wound back onto a receiving spool 64 in the chamber 60. A block 66 of a solid nickel/cobalt alloy (preferably 80% cobalt and 20% nickel) is positioned within the chamber 60 at a location such that the strip 10 passes over it as the strip moves from the supply spool to the receiving spool. The block 66 is maintained in a liquid cooled jacket 68 to keep it from melting during the deposition process. An electrode 70, which may be made of steel, is positioned near the surface of the block 66 which faces the strip 10. A voltage source 72, which is capable of generating approximately 2000 volts, is applied between the block 66 and the electrode 70. This voltage causes an arc 73 to be struck between electrode and the block. This results in a sputtering action in which a stream of atoms of the block material 66*a* are driven off the block and thrown against the strip 10. Thus, an atom by atom deposition of the block material is produced on the strip. Preferably the strip 10 is moved between the spools 62 and 64 at a rate of about 1 cm per minute. This ensures that an adequate amount of the high magnetic coercivity material from the block will be deposited on the strip. This sputtering action can take place of room temperature. It will be appreciated that the strip 10 may be masked in any of the ways described above in order that the material to be deposited by sputtering will be applied only to selected regions of the strip.

It will be appreciated that in each of the embodiments described herein, a higher coercivity magnetic material used for desensitizing is applied to the base material of the target or marker in a deposition process in which application of the higher coercivity material occurs on an atom by atom basis. This produces intimate contact between the base material and the higher coercivity material; and it avoids the need for any intermediate adhesive or other material to connect the two materials. As a result, an effective deactivatable marker can be made with less material and fewer manufacturing steps than was previously necessary. Also, the resulting marker is thinner and more easily handled than prior art deactivatable markers and is better suited for "source tagging", that is, application of the marker to goods during their manufacture.

Figure 6:
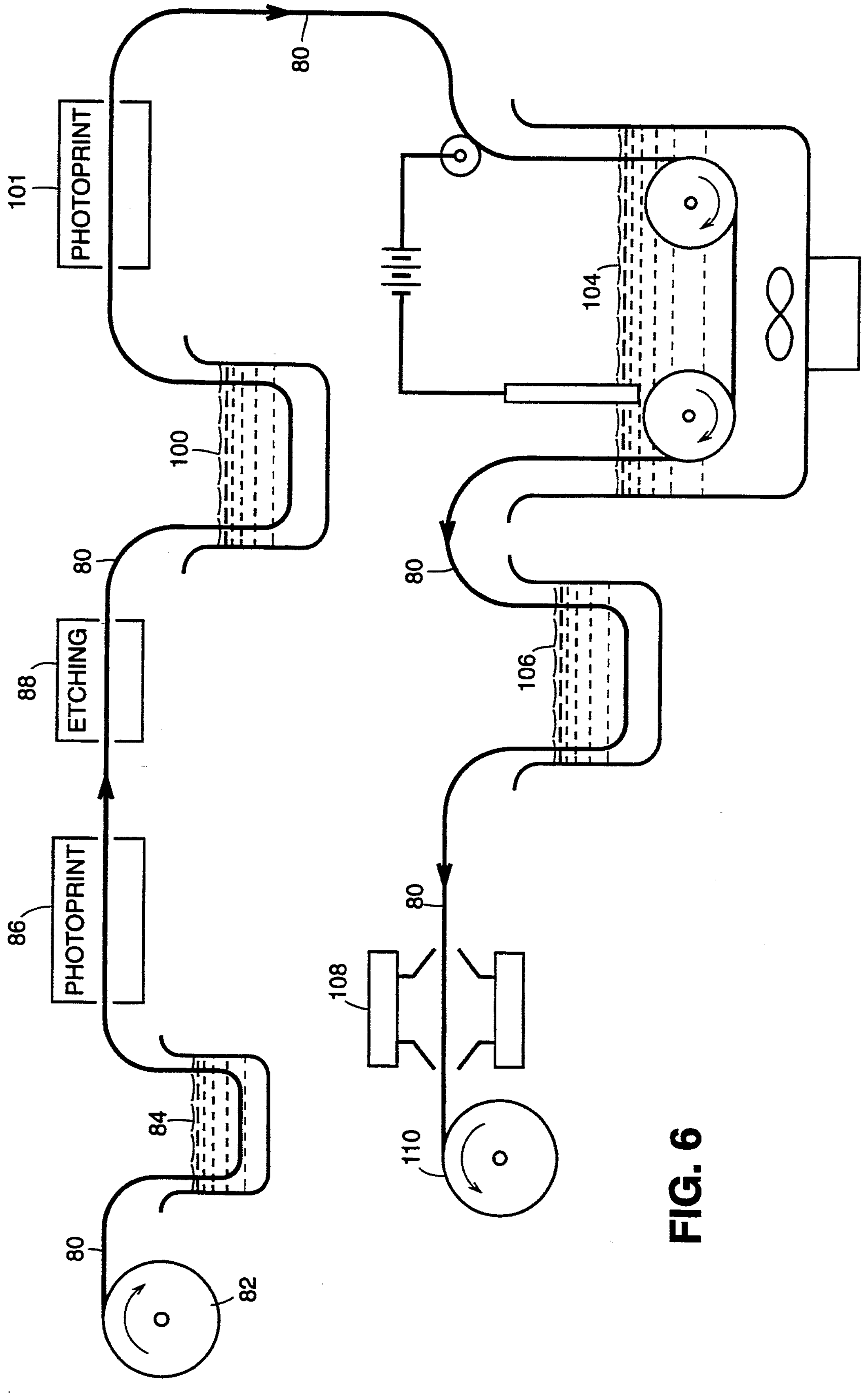
FIG. 6 is a schematic representation similar to FIG. 1 but showing the process as it may be applied to produce markers of different configuration.

The process of the present invention may also be used to produce markers of other configurations, for example, closed loop markers as shown and described in co-pending U.S. patent application No. 08/076,247. In this process, which is illustrated in FIG. 6, a ribbon 80 of a high magnetic permeability, low coercivity material such as Permalloy or an amorphous magnetic alloy, is drawn off from a spool 82. The ribbon 80, which in the illustrated embodiment is about one inch (2.54 cm) in width, is first passed through a degreaser bath 84 which removes impurities from the surface of the ribbon. The ribbon 80 then passes through a photoprint machine 86 and an etching bath 88 which removes material from selected areas of the ribbon according to a special pattern. This special pattern is shown in FIG. 7.

Figure 7:
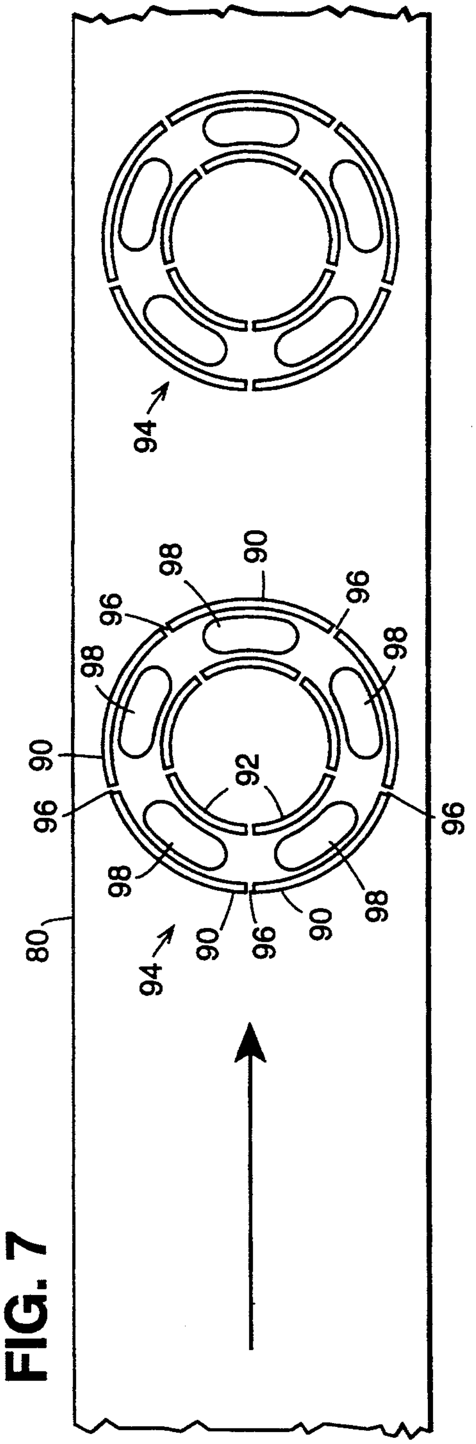
FIG. 7 is a plan view of a portion of a ribbon after an etching step in the process shown in FIG. 6.

As shown in FIG. 7, arcuate slits 90 and 92 are etched out of the ribbon 80. These slits form individual patterns 94 each comprising a pair of concentric circles. The slits forming each circle are separated by thin bridges 96 which provide support during manufacture but can readily be snapped apart at a subsequent time. Also, elongated arcuate openings 98 are formed by etching in the regions between the inner and outer circles.

Figure 8:
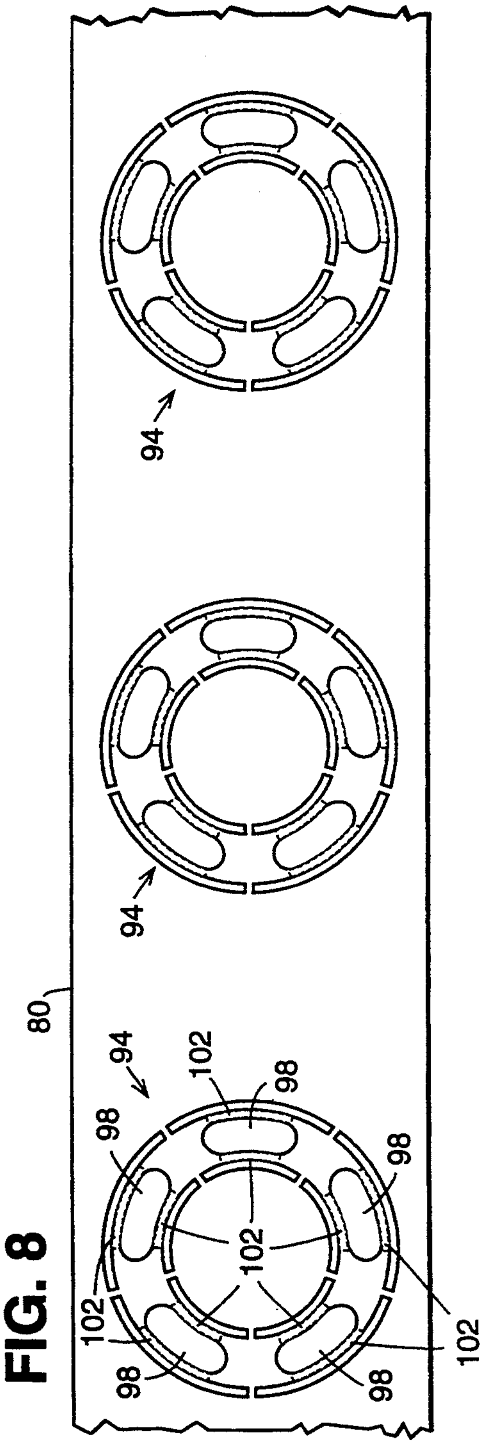
FIG. 8 is a plan view of a portion of the ribbon after a masking step in the process shown in FIG. 6.

Reverting to FIG. 6, the etched ribbon 80 passes through a cleaning and rinsing bath 100 and from there it passes through a photoprint operation 101 which applies masking in selected regions. This masking is shown in the dashed outlines 102 of FIG. 8; and as can be seen, the masking extends along the arcuate strips formed on each side of the openings 98. The masking is resistant to electroplating. The thus patterned and masked ribbon 80 is then passed through an electroplating bath 104 similar to that described in connection with FIG. 1. In the electroplating bath a high magnetic coercivity metal, such as described in connection with the preceding embodiment, is applied to the unmasked regions of the patterned ribbon.

Figure 9:
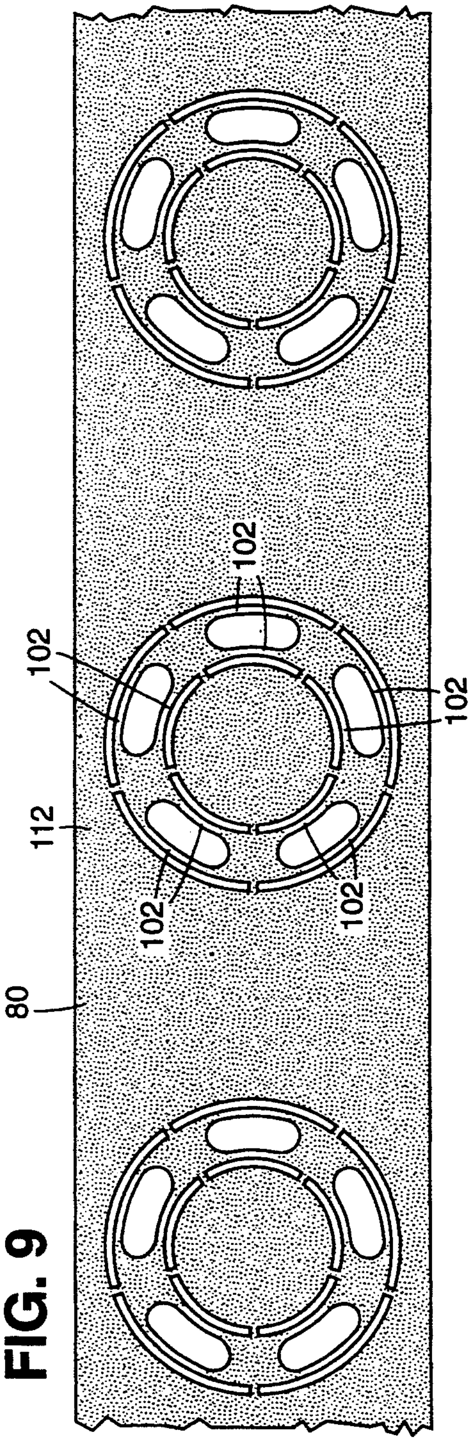
FIG. 9 is a plan view of a portion of the ribbon after a plating step in the process shown in FIG. 6.
Figure 10:
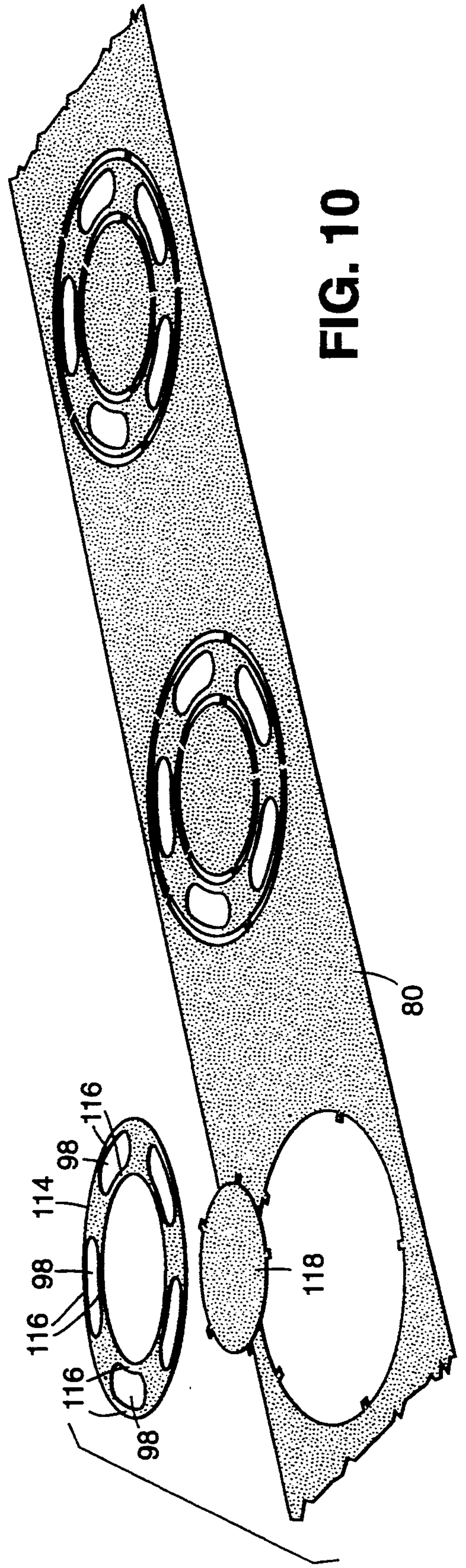
FIG. 10 is a partially exploded perspective view of the ribbon shown in FIG. 9 and showing the manner of removing individual markers from the ribbon.

Following the plating operation, the ribbon 80 is passed through a rinsing solution 106 and a dryer 108 and is then wound up onto a receiving spool 110. The ribbon as wound onto the spool 110 appears as shown in FIG. 9. As can be seen by stippling 112, the entire ribbon, except for the thin arcuate regions adjacent the openings 98 is electroplated with the high coercivity material. Thereafter, when markers are to be applied to merchandise, they can be snapped out of the ribbon 80 as shown in FIG. 10. As can be seen, a ring shaped marker 114 with openings 98 and thin arcuate unplated strips 116 alongside each opening, is snapped out of the ribbon 80 and a center circle 118 is punched out of the center of the marker.

It will be appreciated that the process of the present invention is not limited to the specific shape of the markers nor to the location on the markers that are masked; and in fact, for some applications no masking may be used so that the entire marker will be plated. Also, the invention does not depend on the particular type of masking to be used nor on the particular process used to produce the masking. Further, the vacuum deposition and the sputtering processes described above may be used in place of the electroplating process to produce deactivation elements on markers of various shapes such as the ring shaped markers 114 shown in FIG. 10. What is important is that the deactivation elements be applied on an atom by atom basis so as to achieve an intimate bond between the marker material and the deactivation element material.

We claim:

1. A deactivatable electronic article surveillance system marker comprising:

an element of easily magnetizable material having high magnetic permeability and low magnetic coercivity such that said material, when subjected to continuous alternating magnetic interrogation fields, will produce characteristic detectable disturbances of those fields; and another magnetizable material which has a higher magnetic coercivity than the material of said element, said another magnetizable material being in direct contact with said element on an atom by atom basis, the interface between said magnetic materials being essentially free of any other materials.

2. A deactivatable marker according to claim 1, wherein said another material is electroplated onto the surface of said element.

3. A deactivatable marker according to claim 1, wherein said another material is vacuum deposited onto the surface of said element.

4. A deactivatable marker according to claim 1, wherein said another material is sputtered onto the surface of said element.

5. A deactivatable marker according to claim 1, wherein said another material is arranged at spaced apart locations along said element.

6. A deactivatable marker according to claim 1, wherein said element is a portion of an elongated strip of said high permeability material and wherein said another material is deposited onto said strip.

7. A deactivatable marker according to claim 1, wherein said element is a ring shaped member and wherein said another material is deposited at discrete spaced apart locations around said member.

* * * * *

UNITED STATES PATENT AND TRADEMARK OFFICE

CERTIFICATE OF CORRECTION

PATENT NO. : 5,401,584

DATED : March 28, 1995

INVENTOR(S) : Arthur J. Minasy, et. al.

It is certified that error appears in the above-indentified patent and that said Letters Patent is hereby corrected as shown below:

COLUMN 1

Line 53, "fields the" should read --fields. The--

COLUMN 5

Line 4, "0.0006 mm X 0.0025 mm)" should read
--0.0066 mm X 0.025 mm)--

Signed and Sealed this

Fourth Day of June, 1996

Attest:

BRUCE LEHMAN

*Attesting Officer*

*Commissioner of Patents and Trademarks*